United States Patent [19]
Locke

[11] 3,965,328
[45] June 22, 1976

[54] LASER DEEP CUTTING PROCESS

[75] Inventor: Edward V. Locke, Rockport, Mass.

[73] Assignee: Avco Corporation, Cincinnati, Ohio

[22] Filed: Dec. 19, 1974

[21] Appl. No.: 534,173

[52] U.S. Cl. .......................................... 219/121 LM
[51] Int. Cl.² ......................................... B23K 26/00
[58] Field of Search... 219/121 L, 121 LM, 121 EB, 219/121 EM, 69 R; 331/94.5 R

[56] References Cited
UNITED STATES PATENTS

| | | | |
|---|---|---|---|
| 3,569,660 | 3/1971 | Houldcroft | 219/121 LM |
| 3,597,578 | 8/1971 | Sullivan et al. | 219/121 L |
| 3,604,890 | 9/1971 | Gullaney et al. | 219/121 L |
| 3,629,546 | 12/1971 | Fry | 219/121 L |
| 3,746,831 | 7/1973 | Sciaky | 219/121 EM |
| 3,749,878 | 7/1973 | Sullivan et al. | 219/121 L |
| 3,824,368 | 7/1974 | Locke | 219/121 LM |
| 3,848,104 | 11/1974 | Locke | 219/121 L |
| 3,860,784 | 1/1975 | Brown et al. | 219/121 LM |

OTHER PUBLICATIONS

"Laser Cutting" by M. J. Adams, Engineering, vol. 210, No. 5463, pp. 779–782, 1971.
"Processes Introduction to Gas Jet Laser Cutting" by M. J. Adams, Metal Construction and British Welding Journal, pp. 1–8, 1970.

Primary Examiner—Bruce A. Reynolds
Assistant Examiner—G. R. Peterson
Attorney, Agent, or Firm—Charles M. Hogan; M. E. Frederick

[57] ABSTRACT

A process of cutting thick metal workpieces wherein a cutting laser beam is inclined back from a cutting direction and oscillated in a direction parallel with the cutting direction while a gas jet is directed from above the workpiece at an angle approximately normal to the direction of the laser beam incident on the workpiece to blow away the laser melted material as it is produced.

6 Claims, 1 Drawing Figure

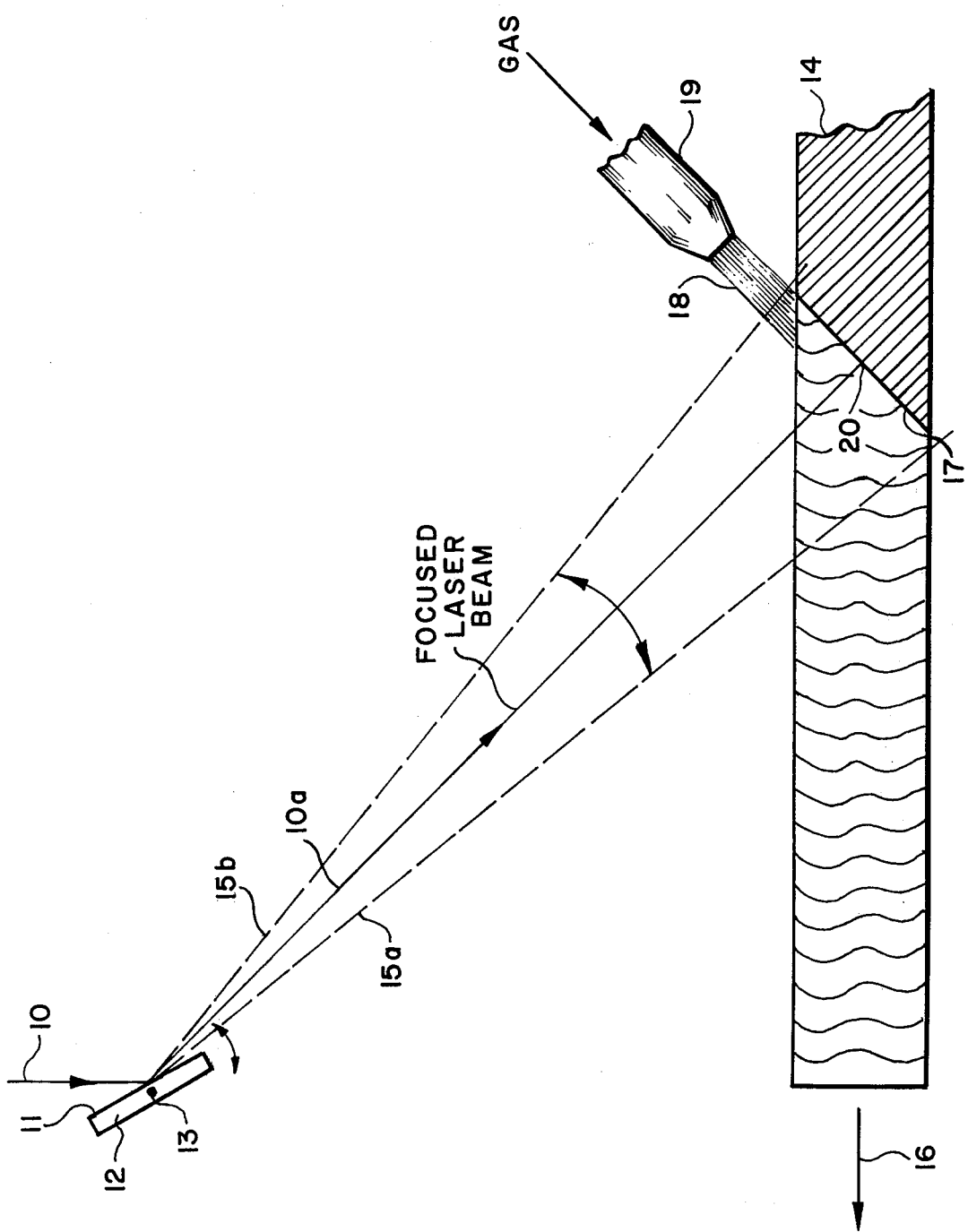

LASER DEEP CUTTING PROCESS

BACKGROUND OF THE INVENTION

This invention is concerned with the cutting of materials by means of a focused laser beam.

As a heat source, a laser beam permits an energy concentration of exceedingly high order and for some years, the laser has been known as a piercing instrument where fine holes are required and as a cutting instrument for relatively thin workpieces. A laser beam can be focused to a small spot with considerable accuracy and CW lasers are now commercially available which can deliver energy (10 kW and above) to a workpiece at a rate sufficient to boil or evaporate the workpiece material in its path to provide a cutting process. Consequently the laser has been considered as an out-of-vacuum cutting instrument for many materials and to make narrow cuts in such materials as would not be possible with conventional cutting methods.

Heretofore it has been discovered that if a jet of gas which produces an exothermic reaction is so directed that it flows onto the region of the workpiece at which a laser beam is focused, not only is there an increase in the rate of cutting, but the accuracy and fineness of the cut are substantially unimpaired by the addition of the gas stream in spite of the fact that the cross-sectional area of this stream at the workpiece may differ by an order of magnitude from that of the laser beam. The width of such cuts are determined largely by the width of the laser beam and not by the gas jet, which controlled the width of cuts in prior art processes of thermal cutting which utilize an exothermic reaction.

For a more comprehensive discussion of gas assisted laser cutting including various arrangements and orientations of the laser beam and gas jet, reference is made to U.S. Pat. No. 3,597,578.

SUMMARY OF THE INVENTION

In the method according to the present invention, a high power laser beam from a preferably relatively high $f$-number telescope is caused to impinge on a mirror which is made to controllably oscillate through a predetermined arc at a predetermined rate. The direction of the laser beam is at an angle to a plane perpendicular to the surface of the material being cut and the laser beam is oscillated in a direction parallel with the cutting direction. A gas jet is directed at an angle approximately perpendicular to the direction of the incident laser beam to blow away the material melted by the laser. The various parameters such as, for example, the linear rate of cutting speed, beam intensity, rate of oscillation at the workpiece, depth of field of the focused laser beam and the like are selected to result within the cut of a depth to width ratio of molten material of about unity.

The present invention permits the efficient cutting of plates thicker than that heretofore reasonably possible and/or the cutting of such plates formed of difficult to cut alloys such as stainless steel, iconel, nickel and the like. Thus, the present invention permits the production of high-speed narrow kerf and heat affected cuts with good quality edges that are relatively free of oxide contamination. Such cuts can be made to depths of the order of that of the depth of field of the laser beam; that is, 2–6 inches or more.

BRIEF DESCRIPTION OF THE DRAWING

The above and other advantages and objects of the invention will be more clearly understood from the following description when read with reference to the accompanying drawing which is a functional operational diagram partly in cross-section of the process of the present invention when cutting thick sheet metal.

DESCRIPTION OF THE PREFERRED EMBODIMENT

Directing attention now to the drawing, it will be seen that a laser beam 10 from any suitable laser source (not shown) of sufficient output power capability impinges on the reflective surface 11 of a mirror 12 pivotable about an axis 13 normal to the direction of the laser beam incident thereon. The cutting portion 10a of the laser beam is then reflected toward the workpiece 14. The mirror 12 is disposed above and forward of the point at which cutting is to occur and may be caused to oscillate about its axis 13 by any suitable and conventional means. The extent of oscillation of the laser beam is indicated by broken lines 15a–15b. The workpiece 14 is movable relative to the cutting portion 10a of the laser beam as suggested by the arrow 16. Thus, as shown in the drawing, the cutting direction is parallel to the surface of the drawing and the workpiece moves from right to left. A focused laser beam is required. Accordingly, the necessary focusing by optical devices known in the art may be provided before the laser beam reaches the mirror or, alternately, may be provided by the mirror itself by simply providing the mirror with the desired reflecting and focusing surface.

As will now be apparent, the cutting portion of the laser beam is inclined back from the cutting direction. Thus, if the workpiece moves, for example, from right to left toward the laser beam as shown in the drawing, the direction of the laser beam is from left to right downwardly toward the workpiece. Thus, the direction of cut lies in the plane of the laser beam 10 and is toward the active face of the mirror 12 or means directing the inclined laser beam onto the workpiece.

The laser beam is inclined back at an angle to a plane perpendicular to the horizontal surface of the workpiece to provide when oscillated as more fully described hereinafter, an inclined cutting surface 17 within the workpiece. The angle of the inclination of the cutting surface 17 optimally is about 20°–30° to the normal.

To remove material as it is melted on the cutting surface 17, a stream of gas 18 such as an inert or exothermically reactive gas is provided from a suitable source 19. The gas stream 18 is directed on to the workpiece 14 and specifically on to the point of intersection of the laser beam 10a and the workpiece as the laser beam is oscillated back and forth to define the cutting surface 17. Conveniently, the source 19 is disposed above the surface of the workpiece to direct the gas stream in a direction toward the cut and substantially normal to the direction of the laser beam so as to always direct the gas stream at the instantaneous cutting point 20 between the molten material of the workpiece and the laser beam and thereby remove molten material as it is produced.

The velocity of the gas stream is regulated in conventional manner to assure that no interfering effects are produced in the operation of the laser beam. Specifically, the velocity of the gas passing the local area at which the laser beam strikes the workpiece, is such that no effects are applied directly to the laser beam. From the viewpoint of the laser beam, therefore, its operation remains unaltered with the presence of the gas stream.

The provision of the laser beam and gas stream both from above and from opposite sides of a plane perpendicular to the workpiece is a necessary criteria for cutting thick workpieces in accordance with the invention. A further criteria is the oscillation of the laser beam from a relatively high $f$-number telescope in a direction parallel with the cutting direction. The laser beam must be oscillated from a point just above the upper surface of the workpiece to a point just below the lower surface of the workpiece. Further, the instantaneous speed of the laser beam on the workpiece is important. Many parameters are involved and/or available for selecting or determining the aforementioned instantaneous speed of the laser beam and may be adjusted or selected as desired or appropriate to provide a speed such that the depth to width ratio of the molten material within the cut is about unity. As will be evident in view of the preceding discussion, if the speed of the laser beam is too low, the cut will tend to have an unnecessarily high width dimension and heat affected zone and if the speed is too high, the cutting rate among other things, will be adversely affected.

Thus, for example, for a given material, beam intensity, gas flow rate, beam focal length and distance between components, the frequency and magnitude of oscillation of the mirror is selected to minimize the heat affected zone, width of cut, and the formation of an ionized cloud at the workpiece and to give a depth to width ratio of molten material or new cut of about unity. While transverse oscillation of the laser beam or the like may be useful in certain applications to facilitate cutting and/or the provision of maximum power density in the laser beam, depths of cuts at least comparable to the depth of the field of the focused laser beam may be conveniently and efficiently provided with longitudinal oscillation of the laser beam.

To cut, for example, a 2-inch thick plate in accordance with the invention, the laser beam may be provided from a relatively high $f$-number telescope ($f$-20, for example) and deflected from a mirror as illustrated in the drawing. The mirror may be made to oscillate at a frequency of about 3 Hz thereby causing the focal point of the beam to sweep back and forth over a range of about 2.8 inches and provide an average instantaneous speed of about 1,000 inches per minute on the workpiece. With both a laser spot size and melting depth of about 25 thousandths of an inch, an appropriate feed rate for such a 2-inch thick material would be in the range of about 10 to 20 inches per minute.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:
1. A method of cutting completely through a thick workpiece having a predetermined thickness on the order of 2 inches or more comprising:
    a. directing from above said workpiece a concentrated laser beam on and at an acute angle to the surface of said workpiece;
    b. moving the laser beam and workpiece relative to one another to define a direction of cut lying in the plane of said laser beam;
    c. causing said laser beam to be oscillated at a predetermined rate parallel to the direction of cut through an arc sufficient to form a cutting surface including molten material, said cutting surface extending through said workpiece at an angle substantially normal to the direction of said laser beam at said acute angle to the surface of said workpiece;
    d. directing a jet of gas at an angle substantially normal to the direction of said laser beam onto the point of intersection of the laser beam and said cutting surface in said workpiece as the laser beam moves back and forth along said cutting surface; and
    e. sweeping the molten material along said cutting surface and out of the bottom of the cut by means of the jet of gas and thereby define said cut as said workpiece and laser beam are moved relative to one another.

2. A method in accordance with claim 1 wherein the rate of oscillation provides an instantaneous laser beam speed on the workpiece to provide within the cut a depth to width ratio of molten material of about unity.

3. A method in accordance with claim 1 wherein said laser beam is focused to provide a depth of field not substantially less than the depth dimension of said cut.

4. A method in accordance with claim 1 wherein said laser beam is disposed at an angle in the range of about 20°–30° from the normal to said surface of the workpiece.

5. A method in accordance with claim 4 wherein the linear speed of said laser beam is about 1000 inches per minute.

6. A method in accordance with claim 5 wherein the workpiece at the point of intersection with the laser beam is melted to provide molten material to a depth of about 25 thousandths of an inch.

* * * * *

UNITED STATES PATENT AND TRADEMARK OFFICE
CERTIFICATE OF CORRECTION

PATENT NO. : 3,965,328
DATED : June 22, 1976
INVENTOR(S) : Edward V. Locke

It is certified that error appears in the above-identified patent and that said Letters Patent are hereby corrected as shown below:

Title Page, change "Assignee: Avco Corporation, Cincinnati, Ohio"

to read--Assignee: Avco Everett Research Laboratory, Inc,, Everett,

Massachusetts--.

Signed and Sealed this

Nineteenth Day of April 1977

[SEAL]

Attest:

RUTH C. MASON
*Attesting Officer*

C. MARSHALL DANN
*Commissioner of Patents and Trademarks*